US005816164A

United States Patent [19]
Löffler

[11] Patent Number: 5,816,164
[45] Date of Patent: Oct. 6, 1998

[54] METHOD AND APPARATUS FOR MONITORING IMAGE FORMATION ON A PRINTING FORM

[75] Inventor: Gerhard Löffler, Walldorf, Germany

[73] Assignee: Heidelberger Druckmaschinen AG, Heidelberg, Germany

[21] Appl. No.: 808,787

[22] Filed: Feb. 28, 1997

Related U.S. Application Data

[63] Continuation-in-part of Ser. No. 704,360, Aug. 28, 1996, abandoned, which is a continuation of Ser. No. 425,822, Apr. 20, 1995, abandoned.

[30] Foreign Application Priority Data

Apr. 20, 1994 [DE] Germany .......................... 44 13 773.7

[51] Int. Cl.$^{6}$ .............................. B41F 33/00; G06K 9/18; G01N 21/89

[52] U.S. Cl. ............................................ 101/484; 101/395

[58] Field of Search .................................... 101/216, 395, 101/481, 483, 484, 485, 486, DIG. 36, DIG. 46; 400/74

[56] References Cited

U.S. PATENT DOCUMENTS

| | | | |
|---|---|---|---|
| 3,053,181 | 9/1962 | Jorgensen | 101/483 |
| 4,001,594 | 1/1977 | Akimoto et al. | 356/443 |
| 4,488,808 | 12/1984 | Kato | 101/219 |
| 4,606,633 | 8/1986 | Jeschke et al. | 101/DIG. 36 |
| 4,665,496 | 5/1987 | Ott | 101/365 |
| 5,050,994 | 9/1991 | Kipphan et al. | 356/445 |
| 5,125,037 | 6/1992 | Lehtonen et al. | 101/248 |
| 5,134,932 | 8/1992 | Fujino | 101/484 |

FOREIGN PATENT DOCUMENTS

| | | |
|---|---|---|
| 0 295 606 A2 | 12/1988 | European Pat. Off. . |
| 461338 | 12/1991 | European Pat. Off. . |
| 1179318 | 1/1970 | United Kingdom . |
| 1309644 | 3/1973 | United Kingdom . |
| 2064113 | 6/1981 | United Kingdom . |
| 2139774 | 11/1984 | United Kingdom . |
| 88/09954 | 12/1988 | WIPO . |

OTHER PUBLICATIONS

Offsetpraxis Publication Jun. 1988, pp. 16–18, "Erstvorstellung: die Werner–Druckkontrolleiste DKL–4" (First Introduction: The Werner–Pressure Control Strip DKL–4).

Papier und Druck Publication 38 (1989) 6, (Heidrich), pp. 263–264, "Der Druckkontrollstreifen E 1988", (The Pressure Control Strips E 1988).

Bogenoffset Publication No. 3/76, pp. 30–42, "Mess–und Kontrollstreifen zur Qualitätssteuerung im Offsetdruck", (Measure–and Control Strips for Quality Control in Offset Printing).

*Primary Examiner*—Stephen R. Funk
*Attorney, Agent, or Firm*—Herbert L. Lerner; Laurence A. Greenberg

[57] ABSTRACT

Method of controlling imaging of a printing form includes producing on printing material or stock, with a printing press, control patches of an imaged printing form, generating image signals with an image-detecting device from the control patches of the imaged printing form produced on the printing material, and determining with an evaluating device any deviations of the generated image signals from respective reference image signals.

5 Claims, 3 Drawing Sheets

Fig.2
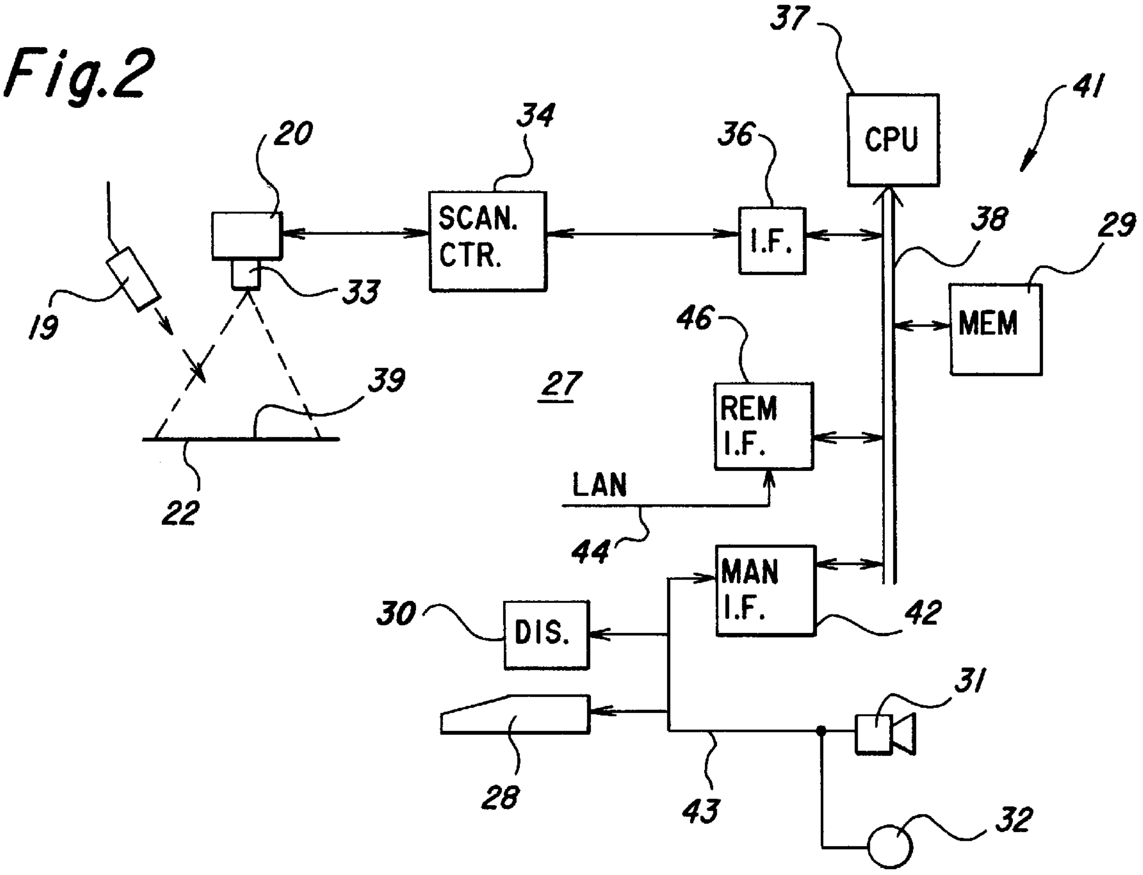
Fig.3
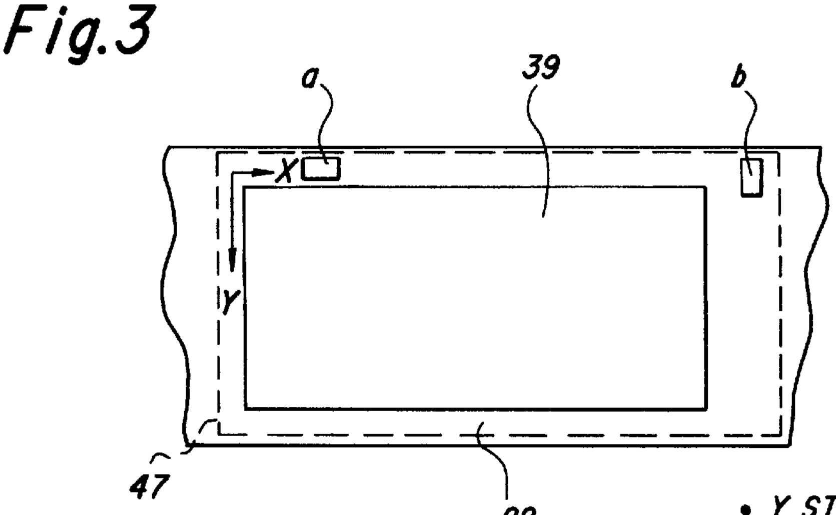
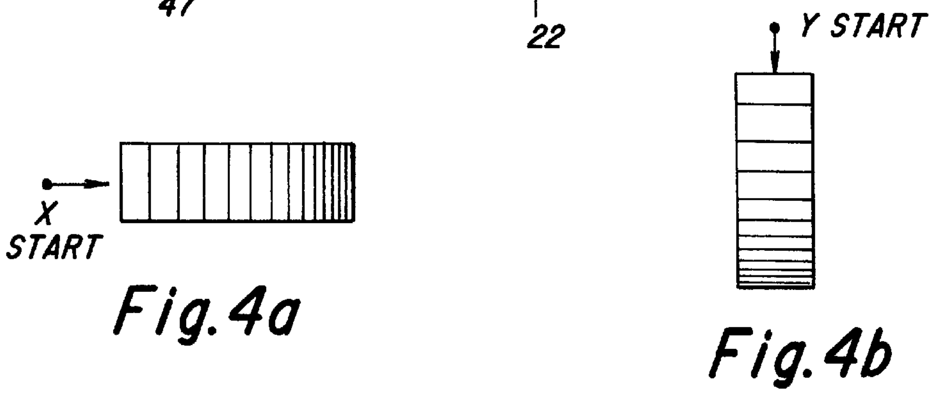
Fig.4a
Fig.4b

METHOD AND APPARATUS FOR MONITORING IMAGE FORMATION ON A PRINTING FORM

CROSS-REFERENCE TO RELATED APPLICATION

This application is a Continuation-In-Part of Ser. No. 08/704,360, filed Aug. 28, 1996, now abandoned, which was a Continuation of Ser. No. 08/425,822, filed Apr. 20, 1995, now abandoned.

BACKGROUND OF THE INVENTION

Field of the Invention

The invention relates to a method of controlling imaging or image formation of a printing form, which provides for assessing the quality of a plate exposure by evaluating control patches of an imaged plate produced on printing material or stock. In order to control the quality of a print produced on printing material or stock visually and metrologically, print control strips including control patches of an imaged plate suitable for visually monitoring the plate imaging are produced at the margins of a sheet, for example, of printing material or stock. Such control elements are described in U.S. Pat. No. 4,288,157 and published German Patent Document DE 24 26 840 Al. The control patches are formed with fine line structures by means of which an operator or other control personnel may investigate whether or not the plates for a printing job have been imaged, i.e., copied, accurately and uniformly by locating the non-transferred graduations of the lines differing in thickness. Furthermore, the patches may have fine or small dot structures or patterns which are used to control the transfer of highlight dots onto the printing material or stock in different area-coverage regions; when the transfer is smooth or undisturbed, specific patches should appear in the printed image.

A disadvantage is that the visual evaluation performed by an operator or control personnel is subjective, time consuming and depends upon the attention and experience of the respective person. It is therefore not possible to make a quantitative statement with regard to the quality of the imaging of the printing form.

Another disadvantage is that the graduations which are not to be transferred, for example, depend upon the resolution of the printing plate and upon whether a positive or a negative copying technique is applied so that, when visual controls being exercised, confusion is likely to arise.

SUMMARY OF THE INVENTION

It is accordingly an object of the invention to provide a method of controlling imaging or image formation of printing forms exactly and objectively.

With the foregoing objects in view, there is provided, in accordance with the invention, a method of controlling imaging of a printing form, which comprises producing on printing material or stock, by means of a printing press, control patches of an imaged printing form, generating image signals, by means of an image-detecting device, from the control patches of the imaged printing form produced on the printing material, and determining with an evaluating device any deviations of the generated image signals from respective reference image signals and/or image quality standards.

In accordance with another mode, the method according to the invention includes generating the image signals while conveying the printing material through the printing press.

In accordance with a concomitant mode, the method according to the invention includes emitting a signal if a respective deviation threshold is exceeded.

Thus, the object of the invention is achieved by providing that control patches of an imaged printing form produced on printing material generate image signals with an image-detecting device, and an evaluation device for the image signals determines, for the control patches of the imaged printing form, deviations of the generated image signals from respective reference image signals and/or image quality standards.

Due to the invention the result of the control is wholly independent of subjective influences by the personnel responsible for performing the control. The control is effected quickly, accurately and reliably. The evaluation of the image signals may be computer-controlled, thereby providing a numeric output of the control results in the form of length specifications for the resolution of a printing form and the degree of the transfer of halftone values or an established numerical quality standard.

It is advantageous to generate image signals directly when the printing material is conveyed through the printing machine and to emit a signal if a respective threshold of a deviation is exceeded.

Other features which are considered as characteristic for the invention are set forth in the appended claims.

Although the invention is illustrated and described herein as a method of controlling imaging or image formation of a printing form, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description when read in connection with the accompanying drawings in which there is shown diagrammatically and schematically a printing press suitably equipped for performing the method according to the invention.

BRIEF DESCRIPTION OF THE DRAWINGS

FIG. 2 is a block diagram showing the component blocks of the image control system according to the invention;

FIG. 3 is a diagrammatic plan view of a section of printing material, having control patches imaged thereon;

FIG. 4, *a* and *b*, is a diagrammatic plan view of an image printed by a printing plate to be measured, and two control patches.

DESCRIPTION OF THE PREFERRED EMBODIMENTS

Figure 1:
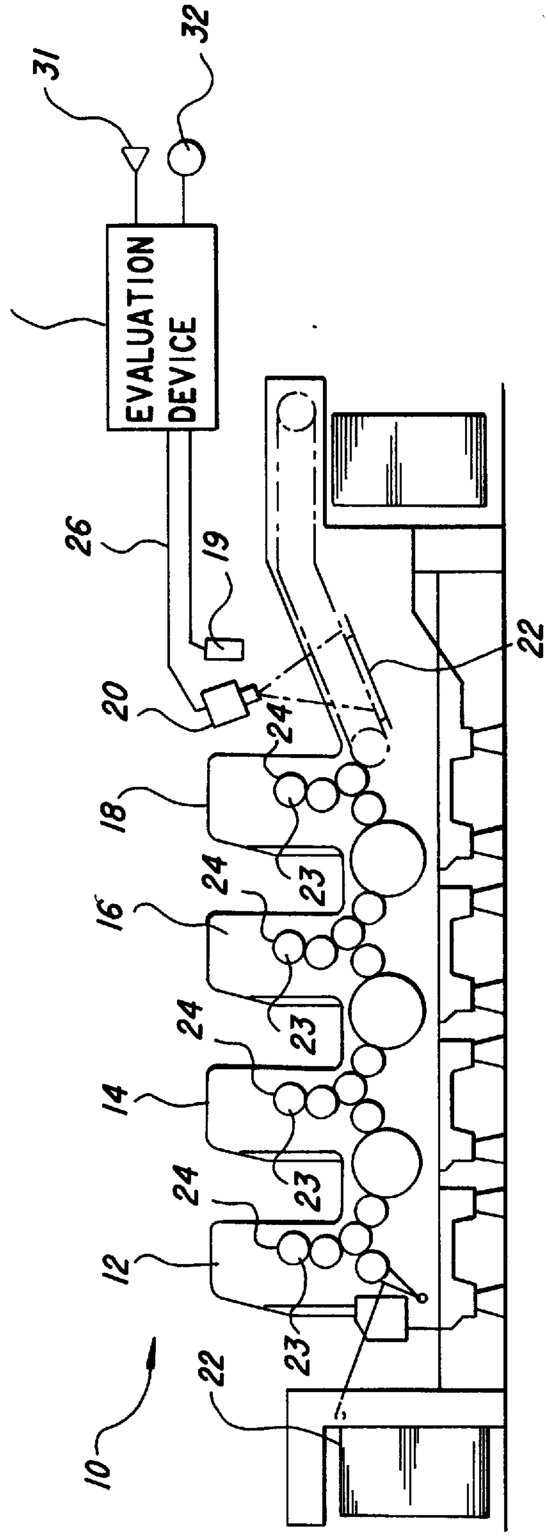
FIG. 1 is a diagrammatic elevation of a typical printing machine arranged to operate according to the invention.

Referring now to FIG. 1 of the drawing, there is shown a conventional offset printing press 10 having four printing units 12, 14, 16 and 18, each arranged to print a respective color, an image-detecting or exposing device 20 provided after the last printing unit 18, as seen in conveying direction of printing material 22, and directed to the printing material. The image-detecting device 20 is suited for detecting the entire surface of the printing material 22, while it is illuminated by a suitable illuminator 19.

In each of the printing units 12 to 18, a print control strip having plate-exposure control patches, shown in more detail in FIGS. 3 and 4, is copied onto each printing plate 24, each mounted on a respective plate cylinder 23. The control patches may be conventional and standardized, or they may be especially suitable for evaluation by means of the image-detecting device 20. During printing, the control patches are transferred onto the printing material 22 and detected and scanned by means of the image-detecting device 20. The actual image signals obtained from the control patches are transmitted via a transmission channel 26 to an evaluation device 27, such as a comparator or microprocessor 37 (FIG. 2) in which they are evaluated and compared with stored reference image signals for the plate-exposure control elements stored in memory in the evaluation device 27. Nominal values for the lines and/or dots to be represented are inputted by means of a keyboard 28, shown in FIG. 2, into the microprocessor 37 and stored in a memory 29, therein. Measuring signals representing the imaging quality of the printing plate 24 are derived from the comparison signals measured by the device 27. If a printing plate has not been accurately imaged and the comparison signal does not meet a given value quality standard, an optical or acoustic signal may be emitted by annunciators 31, 32 notifying the operator of the printing press to take remedial action, such as for example exchanging the respective plate 24.

FIG. 2 is a block diagram of the evaluation device 27, showing the image detecting and scanning device 20, scanning an image 39 printed on the printing material 22.

The image 39 is illuminated by an illuminator 19 of conventional construction. The scanning device 20 is conventional, and is capable of addressing each point of the image 39 via an optical system 33 under control of a scanning control 34, which is steered by a computer 41, via a scanning interface 36. The scanning device 20 with its optic 33 has an image resolution of sufficient fineness to address the smallest image element required to attain any specified image quality. The optics 33 is capable of selecting any of the printing colors required to print the image 39. The evaluation device 27 is configured in FIG. 2 as a typical micro-processor having a central processing unit (CPU) 37, of conventional construction. A data bus 38 connects the CPU 37 with the various parts of the processor, such as the scanning interface 36, a memory 29, and manual controls composed of a keyboard 28, a display device 30, and a conventional manual interface 42 connecting the manual controls 28, 30 with the bus 38. The manual interface 42 is also connected via conductors to annunciating devices 31, 32, e.g. in the form of a sounder or horn 31 or an optical device 32 to attract the attention of the printing machine operator if the printing quality falls below a preset value, as entered, e.g. from the keyboard 28.

The printing machine may be remotely controlled and/or monitored via a remote interface 46, connected to a local area network LAN, 44, optionally providing access to a remote printing plate preparation facility.

A memory MEM 29 communicates with the CPU 37 via data bus 38, and contains stored therein control programs for monitoring the printing plate quality, control parameters, and any other functions assigned to the computer 41.

The development of the control programs is performed in accordance with the flow chart shown in FIG. 5, as described in more detail below.

FIG. 3 shows a printed image 39 printed in one of the colors used for the image, on a printing material 22, which may be printed on a continuous web or on a single sheet of material. The printed image falls within a printing border 47 shown in phantom lines. The printing border delineates that part of the image which is printed by the inked printing plate 24.

Within the border 47, but outside the image 39 there are usually a number of test and color marks, not shown, which are used for image registration and color control and the like. In addition, in accordance with the invention, there are also printed two control patches a and b, which are in an advantageous embodiment of the invention, respectively oriented in the printing direction and perpendicular thereto.

The control patches a and b are shown in more detail in FIG. 4, which shows each patch composed of a raster of short lines positioned with increasing density in the scanning direction indicated by respective arrows $X_{START}$ and $Y_{START}$. At the most dense end the short lines are printed in the image color with a high degree of density, preferably as densely as possible with the printing technology available. Any deterioration or degradation in the quality of the printing plate or the printing process will result in loss of regularity in the increasing density of the short lines.

In the preferred embodiment the short lines are printed with a linearly decreasing space between adjacent lines. In this manner the scanner 22, under control of the scanner control 34 and the computer 41, scans the raster in direction of the arrow X or Y (FIG. 3) and counts each short line. In stepping from line to line the computer measures each space and computes the anticipated width of the next space. If the next space deviates in width, beyond a certain tolerance, the computer will stop counting lines, and record the number of lines counted. In case the lines are printed with irregular spacing due to a fault in the plate preparation or the printing, for example such that some lines are too wide or too narrow, the actual line spacing will deviate from the anticipated linear regression, and the computer will determine that an irregularity has occurred. Therefore the computer will count short lines in the scanning direction only as far as the actual measured line spacing is measured and found to be in accordance with the computed linearly decreasing spacing. The count obtained in this manner is a numerical measure of the quality of the printing plate and/or the printing process. It follows that other than a linear regression in the spacing between the short lines could be used if certain advantages are attained thereby.

In measuring the linearly decreasing line spacings, the scanning beam, as controlled by the computer 41 will either progress in incremental steps that are short in relation to the smallest anticipated line spacing, or the measuring can be performed by advancing the scanning beam at a constant speed and recording the time between the beginning and end of each space. It follows that the measured line spacing will then be equal to the time difference between the starting and ending time multiplied by the speed of the scanning beam.

Figure 5:
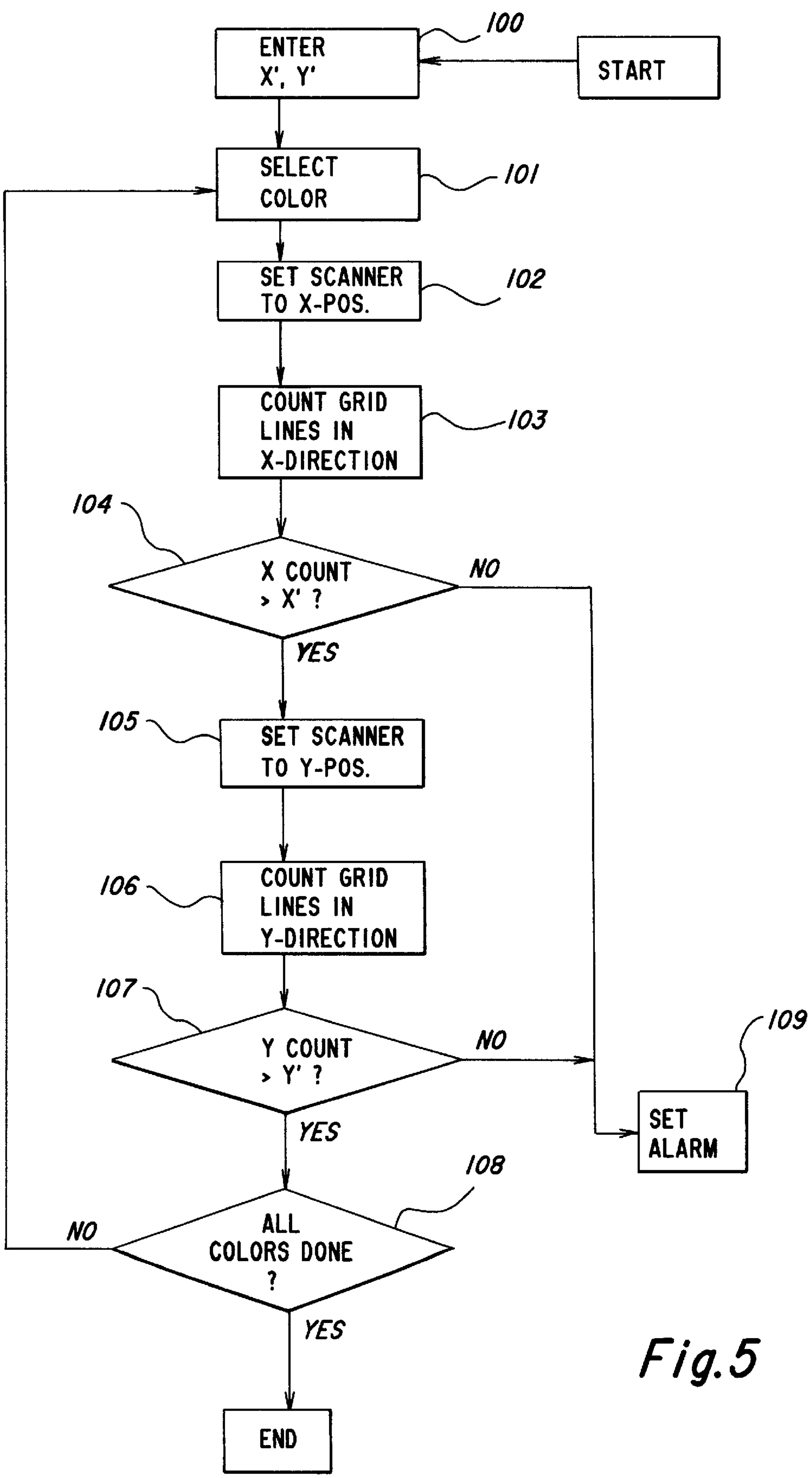
FIG. 5 is a flowchart showing the major steps of the method according to the invention.

FIG. 5 is a flow chart showing the major steps to be performed by the computer 41 in practicing the method according to the invention.

After step “start” 00, the nominal grid line counts X' and Y', indicating the required or nominal quality level are entered in computer memory 29, either from the keyboard 28, via conductor 43 or via the remote interface IF 46. In step 101 the first color to be evaluated is set by an appropriate color filter in optic 33. Next in step 102 a scan in x-direction is initiated by setting the scanning beam to the start scan point $X_{START}$ (FIG. 4*a*) and the grid line count is performed as described above. If the scanned line count falls within an accepted tolerance of the nominal line count, as performed in step 103, the program proceeds to the YES-output of decision step 104. If not, the alarm 109 is activated via step 104 NO. In step 105, the scanning beam is set to the $Y_{START}$ position, and the short grid lines are counted in the Y direction (FIG. 4*b*) in step 106. Again, if the Y-line count falls within a set tolerance of the nominal Y' count, the process proceeds to the next color via decision step 107 YES, and the next color is started in step 108 NO. If the count in step 107 is not within the accepted tolerance the process proceeds to step 109 to set an alarm. When all colors have been scanned the process ends at step END.

The method according to the invention may be employed independently or irrespectively of the particular method used for the printing-plate imaging or image formation.

It follows that the control patches a and b need not be composed of short lines, but may be configured as assemblies of rectangles, dots, or any other type of mark that can be printed with a printing plate. Also the scanning may not be limited to distance between the marks, but could include scanning of printed dimensions in the scanning direction of the marks.

I claim:

1. A method of controlling imaging of a printing form, which includes producing control patches of an imaged printing form on printing material or stock with a printing press, the method comprising the steps of:

generating image signals with an image-detecting device, from the control patches of the imaged printing form produced on the printing material, and determining with an evaluating device any deviations of the generated image signals from respective reference image signals;

wherein said control patches are composed of a plurality of lines and wherein said lines are printed with decreasing separation in a scanning direction.

2. Method according to claim 1, which includes generating the image signals while conveying the printing material through the printing press.

3. Method according to claim 1, which includes emitting a signal if a respective deviation threshold is exceeded.

4. Method according to claim 1, wherein said method includes counting with said evaluation device the number of lines, and comparing said number with a nominal number of lines stored in said evaluation device.

5. Apparatus for measuring quality of imaging of a printing form comprising a printing machine, a printing plate in the printing machine having marked thereon at least one control patch composed of a nominal number of lines, a scanning device for scanning the lines of the control patch, an evaluation device coupled to the scanning device having stored therein the nominal number of lines in the control patch, the evaluation device being operative for counting lines in said control patch and comparing the count of said lines with the nominal quantity of said lines, and an annunciating device for emitting a signal if the scanned number of lines is unequal to the nominal number of lines.

* * * * *